(12) United States Patent
Roscher et al.

(10) Patent No.: US 8,697,818 B2
(45) Date of Patent: Apr. 15, 2014

(54) ALKOXY-CROSSLINKING RUBBER MIXTURES COMPRISING NIOBIUM OR TANTALUM CONDENSATION CATALYSTS

(75) Inventors: Anja Roscher, Munich (DE);
Hans-Juergen Eberle, Munich (DE);
Marco Hofmann, Burghausen (DE);
Uwe Scheim, Coswig (DE)

(73) Assignee: Wacker Chemie AG, Munich (DE)

( * ) Notice: Subject to any disclaimer, the term of this patent is extended or adjusted under 35 U.S.C. 154(b) by 75 days.

(21) Appl. No.: 13/147,224

(22) PCT Filed: Jan. 26, 2010

(86) PCT No.: PCT/EP2010/050850
§ 371 (c)(1),
(2), (4) Date: Aug. 1, 2011

(87) PCT Pub. No.: WO2010/086299
PCT Pub. Date: Aug. 5, 2010

(65) Prior Publication Data
US 2011/0288245 A1    Nov. 24, 2011

(30) Foreign Application Priority Data
Feb. 2, 2009  (DE) .......................... 10 2009 000 556

(51) Int. Cl.
*C08L 83/06* (2006.01)

(52) U.S. Cl.
USPC ......................................................... 525/475

(58) Field of Classification Search
USPC ......................................................... 525/475
See application file for complete search history.

(56) References Cited

U.S. PATENT DOCUMENTS

| 3,334,067 A | 8/1967 | Weyenberg |
| 3,542,901 A | 11/1970 | Cooper et al. |
| 4,525,565 A | 6/1985 | Laisney et al. |

FOREIGN PATENT DOCUMENTS

| EP | 0 102 268 | 3/1984 |
| JP | 2004-238617 | 8/2004 |
| JP | 2007-131799 | 5/2007 |

OTHER PUBLICATIONS

Bradley et al., "Organosilyloxy-derivatives of Metals. Part I. Alkylsilyloxy-derivatives of Titanium, Zirconium, Niobium, and Tantalum", Journal of the Chemical Society, pp. 3404-3411 (1959).
International Search Report for PCT/EP2010/050850 dated Apr. 21, 2010.

*Primary Examiner* — Randy Gulakowski
*Assistant Examiner* — Christopher M Rodd
(74) *Attorney, Agent, or Firm* — Caesar, Rivise, Bernstein, Cohen & Pokotilow, Ltd.

(57) ABSTRACT

The invention provides alkoxy-crosslinking rubber mixtures (M) which comprise a compound of the general formula (1) $M(OR^1)_n(OSiR^2{}_3)_{5-n}$ (1) and polymers with end groups of the general formula (2) —$SiR^3{}_a(OR^4)_{3-a}$ (2), where M is defined as Nb or Ta, $R^1$, $R^2$; $R^3$ and $R^4$ are each hydrocarbon radicals having 1 to 10 carbon atoms, n is 1, 2, 3 or 4, and a is 0 or 1.

3 Claims, No Drawings

ALKOXY-CROSSLINKING RUBBER MIXTURES COMPRISING NIOBIUM OR TANTALUM CONDENSATION CATALYSTS

BACKGROUND OF THE INVENTION

The invention relates to rubber mixtures which crosslink with moisture and which comprise a niobium compound or tantalum compound and polymers having alkoxysilyl terminal groups.

Silicone rubber mixtures which can be stored with exclusion of water and on ingress of water crosslink at room temperature to give elastomers have been known for a long time, and this particularly applies to single-component silicone rubber mixtures (RTV-1). Large amounts of these products are used by way of example as jointing compositions in the construction industry. RTV-1 systems generally comprise a polymeric, mostly linear siloxane, a compound having crosslinking action and comprising groups that are readily hydrolysable, a plasticizer, and optionally other additions, such as a crosslinking catalyst, processing aids, pigments, and fillers. Crosslinking catalysts mainly used currently are Sn catalysts, e.g. dibutyltin diacetate or dibutyltin laurate. However, the recent toxicological classification of these tin derivatives has resulted in increasing criticism of these compounds, and the amounts permitted for use have been reduced accordingly. The use of Sn catalysts is therefore forbidden in elastomers which come into contact with foods, pharmaceuticals, or prostheses. There is a possibility that Sn-containing catalyst systems may be banned completely in the medium or long term. There is therefore a requirement for systems which can operate without tin catalysts but which at the same time have hardening performance comparable with that of conventional tin systems.

Various Sn-free catalyst systems have already been disclosed in the patent literature, especially using Ti compounds and Zr compounds. By way of example, U.S. Pat. No. 3,334,067 describes the use of catalysts such as $Ti(OiPr)_2(acac)_2$ or diisopropoxytitanium bis(ethyl-acetoacetate) which have improved shelf life when compared with standard Sn catalysts. Other titanium chelate compounds are mentioned inter alia in U.S. Pat. No. 3,542,901. Disadvantages of these types of catalyst derive from yellowing and incompatibility with aminic coupling agents. EP 102,268 claims the use of titanium-siloxy compounds, such as $Ti(OSiMe_3)_4$ or $Ti(OSiMe_3)_2(On-Bu)_4$ and, respectively, Zr alkoxides, such as $Zr(On-Bu)_4$. Siloxy-substituted Zr compounds are also used as condensation catalysts in JP 2004-238617A. JP 2007-131799 A describes niobium- and tantalum-alkoxy compounds of the general formula $$M(OR)_5 \ M=Nb, Ta \ R=alkyl$$

which are extremely susceptible to hydrolysis.

A feature common to all of said Sn-free compounds is that, when comparison is made with the familiar Sn systems, there are disadvantageous properties, for example coloring of the rubber compositions, or excessive susceptibility to hydrolysis, or inadequate shelf life.

The present invention is based on the object of providing Sn-free alkoxy-crosslinking rubber mixtures which are not toxicologically hazardous and which give sufficiently high speed, and tack-free hardening.

SUMMARY OF THE INVENTION

The invention provides alkoxy-crosslinking rubber mixtures (M) which comprise a compound of the general formula (1)

$$M(OR^1)_n(OSiR^2_3)_{5-n} \quad (1),$$

and polymers having terminal groups of the general formula (2)

$$-SiR^3_a(OR^4)_{3-a} \quad (2)$$

where
M is defined as Nb or Ta,
$R^1$, $R^2$, $R^3$ and $R^4$ are defined as hydrocarbon moieties having from 1 to 10 carbon atoms,
n is defined as the value 1, 2, 3, or 4, and
a is defined as the value 0 or 1.

The rubber mixtures (M), which use moisture, in particular atmospheric moisture, for alkoxy-crosslinking, are Sn-free, are not toxicologically hazardous, and exhibit a sufficiently high reaction rate, and tack-free hardening.

The Nb compounds and Ta compounds of the general formula (1) are moreover less susceptible to hydrolysis than the organofunctional niobium compounds and organofunctional tantalum compounds used in JP 2007-131799 A.

The hydrocarbon moieties $R^1$, $R^2$, $R^3$, and $R^4$ can be substituted, in particular halogen-substituted, linear, cyclic, branched, aromatic, saturated or unsaturated moieties. It is preferable that the hydrocarbon moieties $R^1$, $R^2$, $R^3$, and $R^4$ have from 1 to 6 carbon atoms, and particular preference is given to alkyl moieties and phenyl moieties. Preferred halogen substituents are fluorine and chlorine. Particular preference is given to methyl, ethyl, propyl, and phenyl.

DETAILED DESCRIPTION OF PREFERRED EMBODIMENTS

The production of the Nb compounds and Ta compounds of the general formula (1) has been described previously (D. C. Bradley, I. M. Thomas, JCS, 1959, 3404-3411). By way of example, $Nb(OSiEt_3)_5$ or $Ta(OSiEt_3)_5$ can be obtained via reaction of $Nb(OEt)_5$ or $Ta(OEt)_5$ with triethylsilanol.

The usual amounts added of the Nb compounds and Ta compounds of the general formula (1) as crosslinking catalysts are at least 0.1% by weight, in particular at least 0.5% by weight, and preferably at most 10% by weight, in particular at most 3% by weight, in each case based on the entire mixture (M).

The alkoxy-crosslinking rubber mixtures (M) are any desired mixtures which can be crosslinked to give elastomers with elimination of alcohols from alkoxysilyl terminal groups. Examples here are mixtures based on polyorganosiloxanes, on polyethers, on polyesters, on polyurethanes, on polyureas, and on copolymers of polyorganosiloxanes, of polyethers, of polyesters, of polyurethanes and of polyureas, in all cases having alkoxysilyl terminal groups.

The Nb compounds and Ta compounds described of the general formula (1) have very good properties as condensation catalysts in the crosslinking of α,ω—OH-functional polydimethylsiloxanes with an alkoxy-functional crosslinking agent. The compounds of the general formula (1) ensure good shelf life of RTV-1 systems. The alkoxy-crosslinking rubber mixtures (M) are therefore preferably single-component silicone rubber mixtures (RTV-1 mixtures).

The RTV-1 mixtures (M) preferably comprise, as polymers having terminal groups of the general formula (2), alkoxy-terminated polyorganosiloxanes of the general formula (3)

$$(R^4O)_{3-a}R^3_aSiO(SiR_2O)_mSiR^3_a(OR^4)_{3-a}, \quad (3),$$

in which a, $R^3$, and $R^4$ are defined as above,
R is defined as for $R^3$, and
m assumes values from 20 to 2000.

Alkoxy-terminated polyorganosiloxanes of the general formula (3) can be produced via reaction of at least one hydroxyl-terminated polyorganosiloxane of the general formula (4)

$$HO(SiR_2O)_mH \quad (4),$$

with at least one alkoxysilane of the general formula (5)

$$R^3{}_aSi(OR^4)_{4-a}, \quad (5),$$

in which a, m, R, $R^3$ and $R^4$ are defined as above.

The desired alkoxy-terminated polyorganosiloxane of the general formula (3) is formed during the condensation (elimination of alcohol) that takes place during that process.

Said reaction usually uses dihydroxypolydimethyl-siloxanes, where R is defined as methyl. Examples of preferred alkoxysilanes are methyltrimethoxysilane and vinyltrimethoxysilane.

The viscosity of the alkoxy-terminated polyorganosiloxanes of the general formula (3) is preferably at least 100 mPa·s, in particular at least 20 000 mPa·s, and preferably at most 700 000 mPa·s, in particular at most 350 000 mPa·s, in each case measured at 25° C.

It is preferable that the RTV-1 mixtures (M) comprise at least 35% by weight, in particular at least 45% by weight, and preferably at most 80% by weight, in particular at most 70% by weight, of polyorgano-siloxanes of the general formula (3).

It is preferable that the RTV-1 mixtures (M) comprise crosslinking agents, plasticizers, fillers, and optionally other known additions, such as stabilizers and pigments.

Examples of fillers for the mixtures (M) are non-reinforcing fillers, i.e. fillers having a BET surface area of up to 50 $m^2/g$, an example being chalks coated with carboxylic acid, and other examples being quartz, diatomaceous earth, calcium silicate, zirconium silicate, zeolites, metal oxide powders, such as aluminum oxides, titanium oxides, iron oxides, or zinc oxides, or mixed oxides of these, barium sulfate, calcium carbonate, gypsum, silicon nitride, silicon carbide, boron nitride, glass powder and plastics powder, such as polyacrylonitrile powder; reinforcing fillers, i.e. fillers with a BET surface area of more than 50 $m^2/g$, examples being fumed silica, precipitated silica, carbon black, e.g. furnace black and acetylene black, and mixed silicon-aluminum oxides having a large BET surface area; fibrous fillers, such as asbestos, and also synthetic fibers.

These fillers can have been hydrophobized, for example via treatment with organosilanes or with organosiloxanes or with stearic acid, or via etherification of hydroxyl groups to give alkoxy groups. It is possible to use one type of filler, and it is also possible to use a mixture of at least two fillers.

Particular mechanical properties are achieved by adding fillers with high specific surface area to the RTV-1 mixtures (M), an example being fumed silica or precipitated calcium carbonate.

If reinforcing silica is used as sole filler, it is possible to produce transparent RTV-1-alkoxy compositions.

It is preferable that the mixtures (M), in particular the RTV-1 mixtures (M), comprise at least 2% by weight, in particular at least 5% by weight, and preferably at most 40% by weight, in particular at most 15% by weight, of filler.

Examples of plasticizers that can be used for the RTV-1 mixtures (M) are alkylaromatics, or dimethyl-polysiloxanes which are liquid at room temperature and which have been end-capped by trimethylsiloxy groups.

Preference is given to the presence of silanes as coupling agents, in particular aminoalkyl-, anhydride-, and epoxy-functional silanes.

It is preferable that the mixtures (M) comprise at least 0.5% by weight, and at most 5% by weight, in particular at most 3% by weight, of coupling agents.

Preferred plasticizers in mixtures (M), in particular RTV-1 mixtures (M), are methyl-terminated polydimethylsiloxanes with viscosities of from 0.1 to 1 Pa·s. It is also possible to use other organic compounds, e.g. particular mineral oils, as plasticizers. The mixtures (M) can use not only the abovementioned components but also, as a function of intended use, any other substance which has also been used hitherto in similar condensation reactions.

The definitions of all of the above symbols in the formulae above are respectively mutually independent. The silicon atom is tetravalent in all of the formulae.

In the inventive examples and comparative examples below, unless otherwise stated, all quantitative and percentage data are based on weight, and all of the reactions are carried out at a pressure of 0.10 MPa (abs.) and at a temperature of 20° C.

Inventive Example 1

Condensation Crosslinking of an α,ω—OH-Functional Polydimethylsiloxane with an Alkoxy-Functional Crosslinking Agent with use of the Siloxy-Functional Compound $Ta(OEt)_4(OSiMe_3)$ 3 g of an α,ω—OH-functional polydimethylsiloxane with a viscosity of 80 000 mPas at 25° C. (25% by weight) are mixed with 9 g of toluene (75% by weight), 0.24 g of vinyltrimethoxysilane (2% by weight), and 30 mg of $Ta(OEt)_4(OSiMe_3)$ (1% by weight of catalyst) in a flask. This gives a clear, homogeneous composition which after 20 minutes has crosslinked completely and gives a tack-free elastomer.

Inventive Example 2

When 3 g of an α,ω—OH-functional polydimethylsiloxane with a viscosity of 80 000 mPas at 25° C. (25% by weight), 9 g of toluene (75% by weight), 0.24 g of vinyltrimethoxysilane (2% by weight), and 30 mg of $Ta(OEt)_2(OSiMe_3)_3$ (1% by weight of catalyst) are used again, the product after 6 h is a completely crosslinked composition.

Comparative Example Using $Ta(OEt)_5$:

3 g of an α,ω—OH-functional polydimethylsiloxane (25% by weight) are mixed with 9 g of toluene (75% by weight), 0.24 g of vinyltrimethoxysilane (2% by weight), and 30 mg of $Ta(OEt)_5$ (1% by weight of catalyst) in a flask. This gives a clear, homogeneous composition which after 16 h has crosslinked completely to give a tack-free product.

Constitution of a Parent RTV1 Mixture:

Various crosslinking catalysts were admixed in the examples below with a parent RTV1 mixture composed of 100 parts by weight of an α,ω—OH-functional polydimethylsiloxane with a viscosity of 80 000 mPas at 25° C., 40 parts by weight of a polydimethylsiloxane having —$OSi(CH_3)_3$ terminal groups (viscosity 1000 mPa·s at 25° C.), 3 parts by weight of vinyltriethoxysilane, and 3 parts by weight of morpholinomethyltriethoxy-silane. The hardening process was monitored over 24 h.

Inventive Example 3

The use of this parent RTV1 mixture and 1 part by weight of $Ta(OEt)_2(OSiMe_3)_3$ gives, after 18 h at room temperature, a completely crosslinked and tack-free elastomer.

Inventive Example 4

The use of this parent RTV1 mixture and 1 part by weight of Ta(OEt)$_4$(OSiMe$_3$) gives, after 18 h at room temperature, a completely crosslinked and tack-free elastomer.

Comparative Example Using Ta(OEt)$_5$:

The use of this parent RTV1 mixture and 1 part by weight of Ta(OEt)$_5$ gives, after 72 h at room temperature, a completely crosslinked and tack-free elastomer.

What is claimed is:

1. An alkoxy-crosslinking rubber mixture which comprises a compound of the general formula (1)

$$Ta(OR^1)_n(OSiR^2{}_3)_{5-n} \qquad (1),$$

and alkoxy-terminated polyorganosiloxanes of the general formula (3)

$$(R^4O)_{3-a}R^3{}_a SiO(SiR_2O)_m SiR^3{}_a(OR^4)_{3-a}, \qquad (3),$$

where

R, R$^1$, R$^2$, R$^3$ and R$^4$ are members independently selected from the group consisting of ethyl and methyl, m is defined as 20 to 2000 n is defined as 1, 2, 3, or 4, and a is defined as 0 or 1, wherein the alkoxy-crosslinking rubber mixture is a single-component silicone rubber mixture (RTV-1 mixture).

2. The alkoxy-crosslinking rubber mixture as claimed in claim 1, wherein the compound of the general formula (1) is present in an amount from 0.1% by weight to 10% by weight, based on a total weight of the mixture.

3. The alkoxy-crosslinking rubber mixture as claimed in claim 1, in which R is methyl.

* * * * *